(12) United States Patent
Parker et al.

(10) Patent No.: US 8,458,742 B2
(45) Date of Patent: Jun. 4, 2013

(54) APPARATUS SYSTEMS AND METHODS FOR SECURELY SHARING CONTENT WITH A PLURALITY OF RECEIVING DEVICES

(75) Inventors: Scott Michael Parker, Aurora, CO (US); David C. Belt, Morrison, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 344 days.

(21) Appl. No.: 12/495,327

(22) Filed: Jun. 30, 2009

(65) Prior Publication Data

US 2010/0333131 A1    Dec. 30, 2010

(51) Int. Cl.
*H04N 7/16* (2011.01)

(52) U.S. Cl.
USPC ............................. 725/31; 725/24

(58) Field of Classification Search
USPC ...................................... 725/24–31
See application file for complete search history.

(56) References Cited

U.S. PATENT DOCUMENTS

| | | | |
|---|---|---|---|
| 2002/0037081 A1* | 3/2002 | Rogoff et al. | 380/278 |
| 2003/0118014 A1* | 6/2003 | Iyer et al. | 370/389 |
| 2005/0028208 A1* | 2/2005 | Ellis et al. | 725/58 |
| 2008/0288996 A1* | 11/2008 | Walter et al. | 725/131 |

* cited by examiner

*Primary Examiner* — Brian Pendleton
*Assistant Examiner* — Cai Chen
(74) *Attorney, Agent, or Firm* — Seed IP Law Group PLLC

(57) ABSTRACT

Various embodiments facilitate secure content sharing between a plurality of receiving devices, such as set-top boxes. One embodiment is a system with a distribution server communicatively coupled via a satellite communication system to a plurality of set-top boxes that are located at different customer premises. The distribution server is operable to provide access control information via the satellite communication system to a first set-top box and a second set-top box of the plurality, with the access control information enabling the first set-top box to securely share content of the first set-top box with the second set-top box. This abstract is provided to comply with rules requiring an abstract, and it is submitted with the intention that it will not be used to interpret or limit the scope or meaning of the claims.

19 Claims, 8 Drawing Sheets

APPARATUS SYSTEMS AND METHODS FOR SECURELY SHARING CONTENT WITH A PLURALITY OF RECEIVING DEVICES

TECHNICAL FIELD

The technical field relates to data sharing and more particularly, to apparatus, systems and methods for sharing data content between a plurality of receiving devices, such as set-top boxes, that are located at distinct user locations.

BRIEF SUMMARY

In one embodiment, a system is provided to facilitate secure content sharing between a plurality of set-top boxes. The system includes a satellite communication system; a plurality of set-top boxes communicatively coupled to the satellite communication system, each set-top box of the plurality of set-top boxes being located at a distinct respective customer premises; and a distribution server communicatively coupled to the satellite communication system, the distribution server configured to provide access control information via the satellite communication system to a first set-top box of the plurality of set-top boxes and to at least a second set-top box, the access control information enabling the first set-top box to share content of the first set-top box with the second set-top box.

The first set-top box of the system being configured to receive via the satellite communication system from the distribution server the access control information, to share content of the first set-top box for use by the second set-top box, and to restrict access to the shared content based at least in part on the access control information received by the first set-top box, such that the second set-top box has access to the shared content and other set-top boxes of the plurality of set-top boxes do not have access to the shared content; and the second set-top box being configured to receive via the satellite communication system from the distribution server the access control information, and to access the shared content of the first set-top box based at least in part on the access control information received by the second set-top box.

In another embodiment, a method for securely sharing data is provided. The method includes: under control of a first set-top box located at a first customer premises, receiving first access control information via a content distribution system; sharing data of the first set-top box for use by a second set-top box, the second set-top box being located at a distinct second customer premises, the second set-top box having received second access control information via the content distribution system; and restricting, based at least in part on the first access control information, access to the shared data in such a manner that the second set-top box can access the shared data based at least in part on the second access control information.

In some embodiments, the method may include: under control of the second set-top box, determining a second cryptographic key based on the second access control information; receiving the shared data from the first set-top box restricted for access by the second set-top box; and decrypting at least a portion of the shared data with the second cryptographic key.

In another embodiment, a method is provided to facilitate secure content sharing between a plurality of set-top boxes. The method includes: under control of a distribution server, receiving a request to enable access for a second set-top box to content of a first set-top box, the first set-top box located in a first customer premises and the second set-top box located in a second customer premises distinct from the first customer premises; and providing to the first and second set-top boxes, via a program distribution system, access control information that enables the first and second set-top boxes to securely share content.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
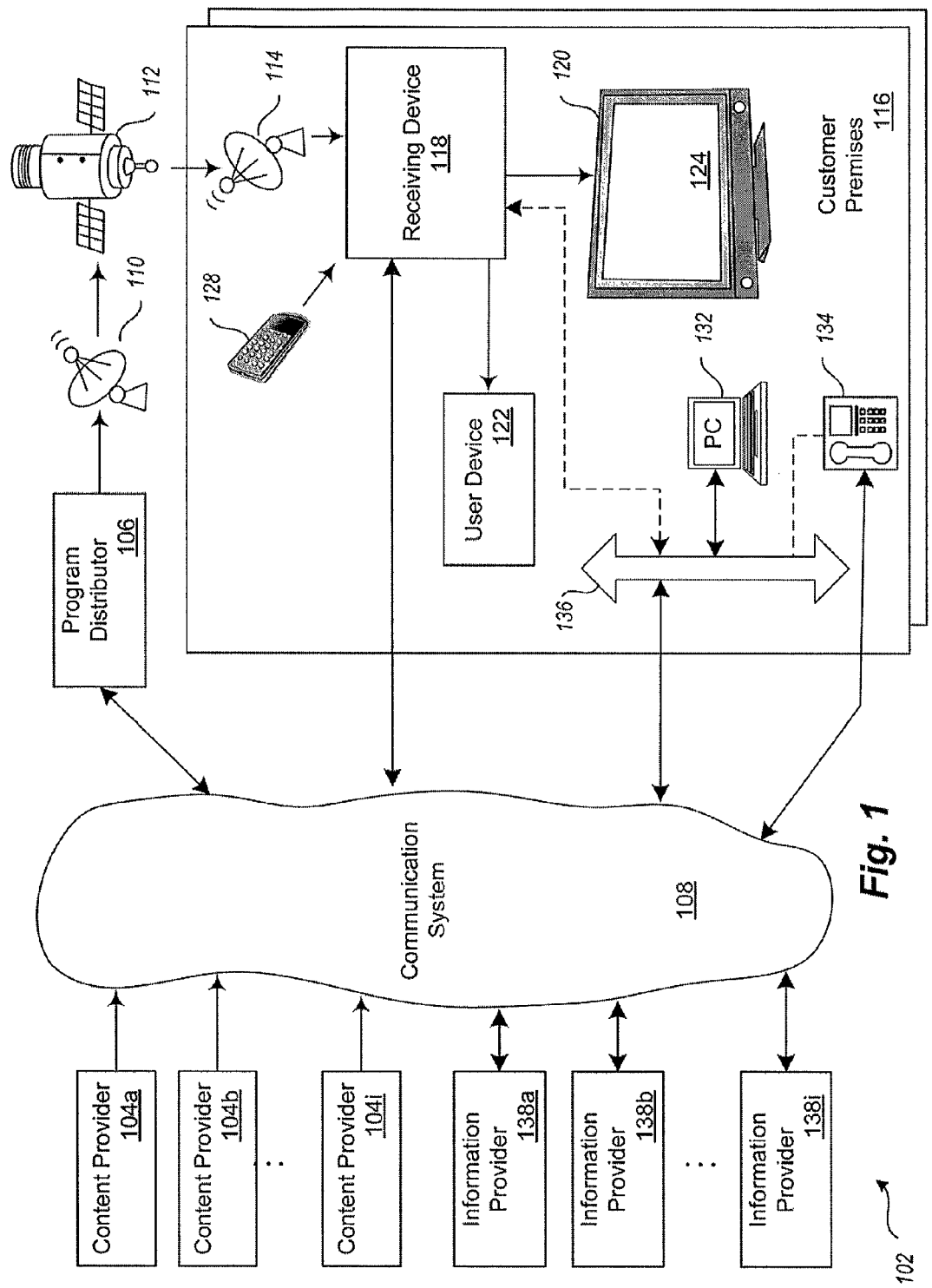
FIG. 1 is a block diagram illustrating an example communication system in which embodiments of a secure content sharing system may be implemented.

FIG. 1 is an overview block diagram illustrating an example communication system 102 in which embodiments of a secure content sharing system may be implemented. It is to be appreciated that FIG. 1 illustrates just one example of a communications system 102 and that the various embodiments discussed herein are not limited to such systems. Communication system 102 can include a variety of communication systems and can use a variety of communication media including, but not limited to, satellite wireless media.

Although various embodiments of the secure content sharing system are discussed with respect to a satellite communication system/network, the various described techniques may apply to other types of content distribution systems, including but not limited to, cable systems, fiber optic systems, telephony systems, and the like. In addition, in various embodiments, a content distribution system may provide various types of content, including, but not limited to, audio (e.g., music, audio books, etc.), video (e.g., television programs, movies, user-generated content, etc.), and other data content.

Audio, video, and/or data service providers, such as, but not limited to, television service providers, provide their customers located at one or more customer premises 116 a multitude of audio/video and/or data programming (hereafter, collectively and/or exclusively "programming"). Such programming is often provided by use of a receiving device 118 communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other user devices 122.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A plurality of content providers 104a-104i provide program content, such as television content or audio content, to a distributor, such as the program distributor 106. Example content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite system to the program distributor 106.

In at least one embodiment, the received program content is converted by one or more devices (not shown) as necessary at the program distributor 106 into a suitable signal that is communicated (i.e., "uplinked") by one or more antennae 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antenna 114 are operable to receive signals from a single satellite 112. Other types of receiver antenna 114 are operable to receive signals from multiple satellites 112 and/or from terrestrial based transmitters.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. The receiving device 118 is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television ("TV") or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk ("CD") recorder, a digital versatile disc or digital video disc ("DVD") recorder, a digital video recorder ("DVR"), or a personal video recorder ("PVR"). User device 122 may also include game devices, magnetic tape type recorders, RF transceivers, and personal computers ("PCs").

Interface between the receiving device 118 and a user (not shown) may be provided by a hand-held remote device 128. Remote 128 typically communicates with the receiving device 118 using a suitable wireless medium, such as infrared ("IR"), RF, or the like. Other devices (not shown) may also be communicatively coupled to the receiving device 118 so as to provide user instructions. Non-limiting examples include game device controllers, keyboards, pointing devices, and the like.

The receiving device 118 may receive programming partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network ("LAN") system, or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116, such as receiving device 118, user device 122, and/or PC 132. For example, information provider 138a may provide requested information of interest to such devices, such as audio, video, and/or other types of data. Information providers 138a-138i may further perform various transactions on behalf of a user of a receiving device, such as when a user purchases a product or service via a receiving device 118 and/or one or more other devices of the user.

The above description of the communication system 102 and the customer premises 116, and the various devices therein, is intended as a broad, non-limiting overview of an example environment in which various embodiments of a secure content sharing system may be implemented. The communication system 102 and the various devices therein, may contain other devices, systems and/or media not specifically described herein. The customer premises 116 may differ from one customer to another, may contain fewer, more and/or other devices, systems and/or media than those described herein.

As noted above, the content providers 104a-104i, the information providers 138a-138i, and/or the program distributor 106 may provide program content and/or various other types of content to a receiving device 118. In some embodiments, the content providers 104a-104i, the information providers 138a-138i, and/or the program distributor 106 may restrict access to program content and/or other types of content, such that distributed content may only be viewed by and/or otherwise accessed by authorized users. In some instances, access to program content may be controlled by encrypting the program content, such that only authorized devices and/or users may access the program content. For example, if the program distributor provides content via a satellite network comprising antenna 110 and satellite 112, then any person in possession of a receiving device 118 may receive the signal or signals carrying the program content and thereby access the program content. In order to control access to the program content, the program distributor 106 may encrypt the program content prior to its transmission, such that even if an unauthorized receiving device 118 receives the program content, it cannot access the program content unless it can obtain one or more appropriate decryption keys.

The receiving device 118 may store or otherwise have access to program content and/or other types of content received from various sources (e.g., content providers 104a-104i, information providers 138a-138i, program distributor 106), such as for use by a user of the receiving device. For example, in some embodiments, the receiving device may store program content, such as for playback to a user of the receiving device 118 using DVR/PVR technology, pay-per-view services, and the like. Program content may include television programs, movies, etc., and/or portions thereof (e.g., clips). In addition, the receiving device may store or otherwise have access to various other types of content that may be presented by or otherwise used by a receiving device, such as including other audio/video content (e.g., user-generated content), audio content (e.g., music), image content (e.g., photographs), and/or various other types of information. In various embodiments, such program content and other content may be stored on various storage medium accessible to the receiving device 118, including one or more hard disks included in the receiving device 118 and/or other devices that the receiving device may access via a communication link (e.g., user device 122, PC 132), and/or other storage media (including removable storage media).

The various embodiments disclosed herein, provide techniques to facilitate secure sharing of program content and/or other content stored on and/or otherwise accessible to a receiving device 118 located at a customer premises 116 with a group of one or more other receiving devices 118 located at one or more other customer premises 116, such that the group of one or more other receiving devices 118 may present or otherwise utilize the shared content. For example, such techniques may allow a customer A to share such content of a receiving device located at customer A's premises, with a group of one or more other customers (e.g., friends, family, etc.) located at other customer premises, such that the one or more other customers may obtain the shared content for presentation and/or use by receiving devices located at the premises of the one or more other customers. After having received and/or otherwise acquired shared content from customer A's receiving device, the shared content may be presented by or otherwise used by the receiving devices of the one or more other customers, such as for presentation on an associated presentation device (e.g., presentation device 120), displaying on a television or other display, playing on a speaker, or the like. Shared content of a receiving device located at a first customer premises may be provided to or otherwise obtained by a group of other receiving devices located at other customer premises in various ways in various embodiments. For example, in some embodiments, shared content may be transmitted between receiving devices, such as via a communication network (e.g., communication system 108 or portions thereof). In some embodiments, shared content may be transported between receiving devices using various other data transmission and/or transfer techniques, including via removable storage media and the like.

In some embodiments, access to shared content of a customer's receiving device may be restricted such that only groups of one or more other receiving devices that are authorized to access the shared content may access or otherwise use the shared content. In at least some such embodiments, access to shared content of a first receiving device may be restricted for use by a group of one or more authorized receiving devices by providing access control information to the first receiving device that enables the first receiving device to encrypt content that it shares with the group of one or more authorized receiving devices, and separately providing access control information to the group of one or more other authorized receiving devices that enables such devices to decrypt content that has been encrypted by the first receiving device. Thus, in such an embodiment, only receiving devices that have been provided with the appropriate access control information may decrypt content that is shared by the first receiving device. In some embodiments, access control information is provided by a program distributor 106 to the various receiving devices via a satellite network comprising antenna 110 and satellite 112. In addition, in at least some embodiments, some or all of the described techniques are performed by an embodiment of a secure content sharing system, such as described in greater detail below.

Example embodiments described herein provide applications, tools, data structures and other support to implement a secure content sharing system. In the following description, numerous specific details are set forth, such as data formats, code sequences, and the like, in order to provide a thorough understanding of the described techniques. Various of the embodiments described can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Secure Content Sharing Overview

Figure 2:
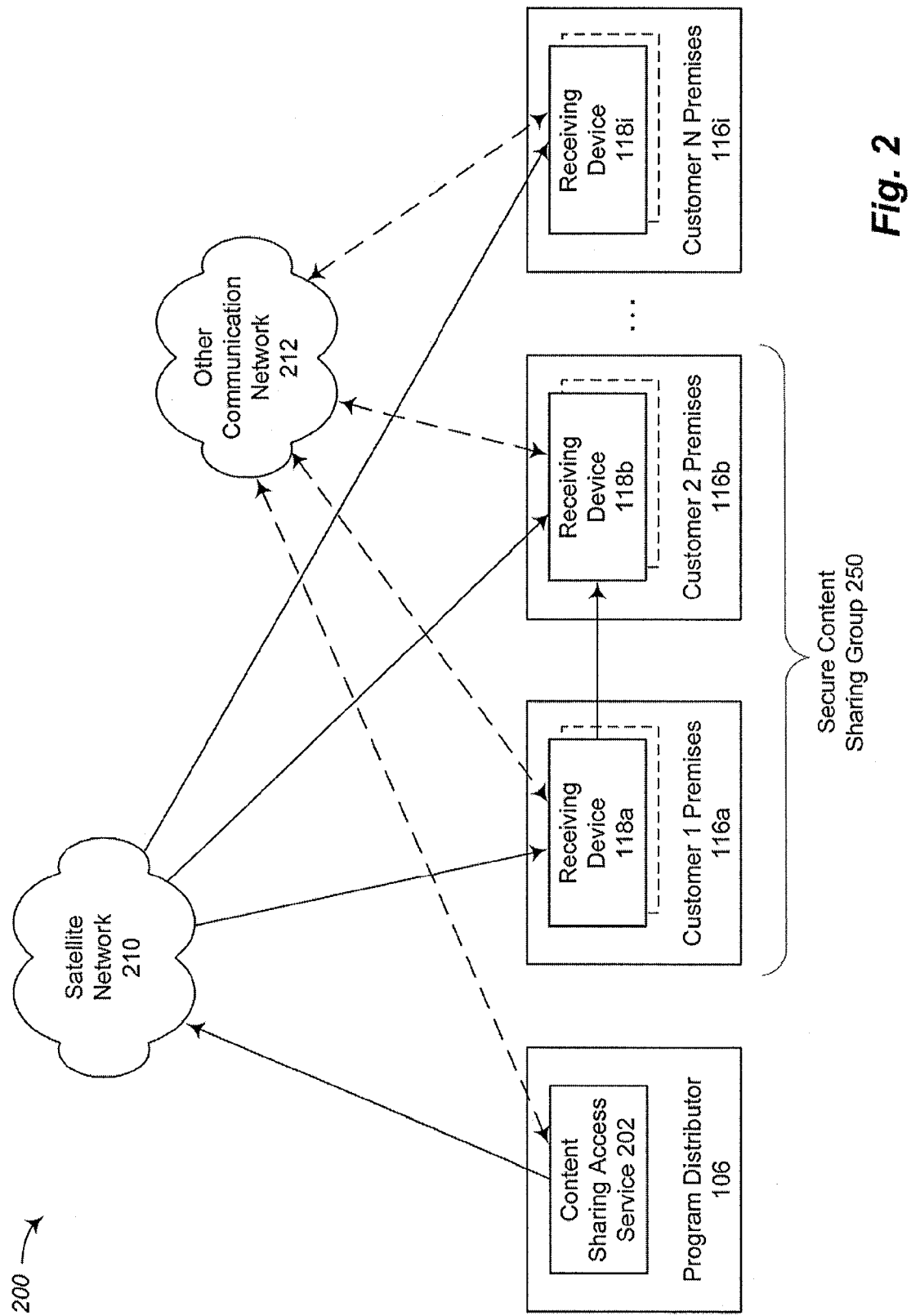
FIG. 2 is a block diagram illustrating an example embodiment a secure content sharing system.

FIG. 2 is a block diagram illustrating an example embodiment of portions of a secure content sharing system 200. The secure content sharing system 200 enables customers of a program distributor 106 to form secure content sharing groups in which the customers share content stored on and/or accessible to receiving devices of the customers with one or more other customers that are authorized to access such content, such that the one or more authorized customers may access and/or otherwise use the shared content on their own receiving devices. The illustrated secure content sharing system 200 includes a program distributor 106, a plurality of receiving devices 118a-118i located at respective customer premises 116a-116i, a satellite communication network 210, and other communication network 212. A content sharing access service 202 is provided by the program distributor 106 to facilitate secure content sharing between various of the receiving devices 118a-118i, such as by providing capabilities related to specifying secure content sharing groups and enabling the receiving devices 118a-118i within secure content sharing groups to encrypt and/or decrypt content that is shared within the groups.

Each of the receiving devices 118a-118i is located at a respective one of the customer premises 116a-116i and receives programming and/or other data provided by the program distributor 106 via the satellite network 210 for use of an associated customer of the particular customer premises. For example, the one or more receiving devices 118a located at customer 1 premises 116a receive programming and/or other data provided by the program distributor 106 for use of a customer 1 located with the customer 1 premises; the one or more receiving devices 118b located at a customer 2 premises 116b receive programming and/or other data provided by the program distributor 106 for use of a customer 2 located with the customer 2 premises; and so on. The satellite network 210 is part of a satellite distribution system and may include, for example, the antenna 110 and the satellite 112 described with respect to FIG. 1.

Various of the receiving devices 118a-118i are interacting with various other of the receiving devices 118a-118i via the other communication network 212, such as to securely share content of the receiving devices in accordance with various of the described techniques, as well as interacting with the content sharing access service 202 to specify or otherwise manage secure content sharing groups. The other communication network 212 may be, for example, a publicly accessible network of linked networks, possibly operated by various distinct parties (e.g., the Internet), a private network (e.g., corporate, university, etc.) that is wholly or partially inaccessible to non-privileged users, one or more private networks with access to and/or from other private and/or public networks, and/or the like. Although not illustrated here, the satellite network 210 and the other communication network 212 may be provided as part of the communication system 108 described with respect to FIG. 1.

As previously noted, various of the receiving devices 118a-118i may be grouped into secure content sharing groups. A secure content sharing group may, for example, include a group of two or more receiving devices located at different customer premises wherein at least one of the receiving devices shares content stored on and/or accessible to the receiving device with the other receiving devices in the secure content sharing group, such that only the other receiving devices in the group are authorized to access or otherwise use the shared content. Access to shared content may be restricted such that only the receiving devices 118a-118i in the secure content sharing group may access or otherwise use the shared content. A receiving device that shares content with other receiving devices in a secure content sharing group is variously referred to as a "sharing device" and/or a "sharing receiving device" in various embodiments. In some embodiments, a secure content sharing group may be configured to include only a single sharing device that shares its content with the other receiving devices in the group, with the other receiving devices being authorized to access content shared by the single sharing device. In other embodiments, a secure content sharing group may include multiple sharing devices that share content with the other receiving devices in the group, and/or may be configured such that all receiving devices in the group share content with each other. Furthermore, in some embodiments, a receiving device may be included in multiple different secure content sharing groups, such as a receiving device that has been authorized to access shared content of multiple sharing devices.

As one illustrative example of a secure content sharing group, the secure content sharing group 250 includes the receiving devices 118a and 118b, located at customer premises 116a and 116b, respectively. In this group, the receiving device 118a shares content with the receiving device 118b, which has been authorized to access or otherwise use shared content of the receiving device 118a. Additional receiving devices may be added or otherwise included in the secure content sharing group 250, such that the additional receiving device may also be authorized to access or use various shared content of receiving device 118a. For example, the receiving device 118i may be added to the secure content sharing group 250, after which the receiving device 118i is authorized to access or otherwise use content shared by the receiving device 118a. Although not illustrated in FIG. 2, various other secure content sharing groups may exist and/or be created. For example, a secure content sharing group may be formed that includes receiving device 118b as a sharing device and receiving device 118i and/or any number of other receiving devices (not shown) as devices that are authorized to access shared content of the sharing device 118b, etc.

As part of configuring a secure content sharing group 250, the content sharing access service 202 interacts via the satellite network 210 with the various receiving devices 118a-118b that are included in the secure content group, such as to provide access control information to the receiving devices to enable the secure content sharing group to share encrypted content that only receiving devices in the group 250 may access. The content sharing access service 202 provides access control information to a receiving device 118a to enable the receiving device to encrypt content that it shares with other receiving devices included in the secure content sharing group. Such access control information may cause and/or otherwise allow the receiving device 118a to determine a cryptographic key to use for encrypting content that it shares with other receiving devices in the group. The content sharing access service 202 also provides access control information to other one or more receiving devices, such as receiving device 118b, that are included in the secure content sharing group 250 to enable such other receiving devices to decrypt content that has been encrypted by the sharing receiving device 118a for use by device in the content sharing group. Such access control information may cause and/or otherwise allow such receiving devices to determine a cryptographic key to use for decrypting the shared content that the sharing receiving device 118a has encrypted. Of course, if other receiving devices are added to the content sharing group 250, such as receiving device 118i, the content sharing access service 202 provides access control information via the satellite network 210 to the other receiving devices to enable such receiving device to decrypt content shared by the receiving device 118a.

After a content sharing group 250 has been configured to share encrypted content that only receiving devices in the group 250 may access, the receiving devices in the group may share the encrypted content in various ways in various embodiments. In some embodiments, the sharing receiving device 118a may transmit encrypted shared content to one or more other receiving devices in the shared content group (e.g., receiving device 118b) via a communication network, such as the other communication network 212 and/or the satellite network 210, such as by using various data transmission protocols (e.g., TCP/IP, FTP, HTTP, and the like). For example, in some such embodiments, the receiving device 118b in the content sharing group 250 may interact with the sharing receiving device 118a via the other communication network 212 to request one or more pieces of shared content from the receiving device 118a, with the receiving device 118a responding to the request by encrypting the requested content pieces for access by the receiving device 118b and providing the encrypted content to the receiving device 118b via the other communication network 212. After the receiving device 118b receives the encrypted content from the receiving device 118a, it may decrypt the content for presentation and/or other use by the content receiving device 118b. In other embodiments, the sharing receiving device 118a may store encrypted shared content on a removable storage media (e.g., USB, CDROM, etc) or other storage media that may be provided to or otherwise made accessible to the one or more other receiving devices in the content sharing group.

Additional details related to configuring receiving devices to share content in a secure content sharing group and related to secure content sharing are described below and with respect to FIGS. 3A-3B.

A secure content sharing group may be created in various ways in various embodiments. In one exemplary embodiment, the content sharing access service 202 provides capabilities that enable customers to specify and/or manage secure content sharing groups via receiving devices of the customers, with the content sharing access service 202 configuring the various receiving devices in the secure content sharing groups according to such customer specification. In some such embodiments, a customer may interact with the content sharing access service 202 to indicate one or more other customers with whom the customer authorizes to share content of a receiving device of the customer. As a result of such interactions, the content sharing access service 202 may determine the various receiving devices that are in the created secure content sharing group (e.g., by accessing a customer database that includes such information, etc.) and interact with the various receiving devices in the created secure content sharing group via the satellite network to provide access control information to the receiving devices, such as described above. As one illustrative example, a customer 1 associated with the customer 1 premises 116a may interact with the content sharing access service 202 via the other communication network 212 to create the secure content sharing group 250, such as by providing information and/or otherwise indicating that the customer 1 wishes to share content of the receiving device 116a with the receiving device 118b associated with a customer 2 associated with the customer 2 premises 116b. After receiving such indications, the content sharing access service 202 provides access control information to the receiving devices 118a and 118b to enable those receiving devices to share encrypted content with the secure content sharing group 250. At a later time customer 1 may interact with the content sharing access service 202 to add one or more other receiving devices to the group, with content sharing access service 202 providing access control information to the added receiving devices to enable them to share content within the group.

The content sharing access service 202 may facilitate the various types of interactions by customers in various ways in various embodiments, such as including programmatic interactions based on an API (Application Programming Interface) provided by the content sharing access service 202 and/or interactive interactions based on a graphical user interface provided to customers (e.g., via one or more Web pages hosted by the content sharing access service 202, via a client-side application of the executing on a receiving device and/or other computing device of a customer, etc.). Although an embodiment has been described that includes a customer interacting with the content sharing service 202 via the other communication network 212 to specify groups of receiving devices that the customer wishes to share content with, other embodiments are possible. For example, in some embodiments, a customer may interact with the content sharing access service 202 to specify secure content sharing groups in other ways, such as by telephoning a customer representative of the program distributor 106, etc.

In some embodiments, the content sharing access service 202 may provide other information to the receiving devices in the secure content group to facilitate formation of a secure content sharing group, such as identifiers that may be used to determine a location of where shared content resides (e.g., a network address of a sharing device, etc.) as well as other information that may be used to identify receiving devices that are in the secure content sharing group, etc. Such other information may be provided to the receiving devices in various ways, such as via the satellite network 210, the other communication network 212, etc.

Although a satellite network 210 is provided in the illustrated embodiment of FIG. 2, it will be appreciated that in other embodiments of a secure content sharing system 200 other program distribution systems/networks may be used, such as including, but not limited to, cable systems, fiber optic systems, telephony systems, and the like. In addition, in some embodiments, the content sharing access service 202 may interact with the plurality of receiving devices 118a-118i to facilitate secure content sharing via the other communication network 212.

As previously noted, the content shared may be a recorded video program, a DVD, an audio file or some other electronic content. The following are examples that may be carried out according to various embodiments. Customer 1 may have watched a particular program of high interest, for example, the Super Bowl, the final show of American Idol, or a particular classic movie. The program may have been recorded on the local DVR or hard disk located in the receiving device 118a at customer 1 premises. Customer 1 may have indicated that such a recorded program is available for access to receiving devices in a content sharing group. At some later time, customer 2, who has been authorized to access shared content of customer 1, may wish to view the program that is stored on customer 1's receiving device 118a. In this case, customer 2 may obtain a copy of the particular recorded program, such as by interacting with customer 1's receiving device 118a via customer 2's receiving device 118b to request access to the particular recorded program, with the particular program being encrypted for use by customer 2's receiving device 118b and then provided to customer 2's receiving device 118b for viewing, such as variously described herein.

A particular example of the use of the system is as follows. Assume that customer 1 is having a Super Bowl party at his home. He invites a number of guests, including relatives, neighbors and friends to watch the Super Bowl together at his home. This is customer premises 116a. Among the guests who attend are his sister and her family, who live a few miles away. The Super Bowl party is enjoyed by those who attend as they watch the plays, the replays and commercials. Customer 1 records the Super Bowl on his local hard disk or DVD inside his receiving device 118a while it is being transmitted so it is now stored in his local machine 118a in his premises for replay when ever he wishes. After the party is over, the guests return to their individual homes. The sister had intended to set her local set-top box to record before going to the Super Bowl party, but neglected to do so. Therefore, when she attempts to watch some of the Super Bowl events at her own home, she is not able to do so. Both have the same satellite network provider, for example, Dish Network®, provided by DISH Network LLC of Englewood, Colo. The sister is customer 2, at premises 116b. At sometime prior, the brother and sister had joined a common customer group with the satellite network provider, for which they may have paid a different fee and may have a different monthly payment structure. They are both in the same Secure Content Sharing group 250. Using the content sharing access service 202 as described herein, the sister may obtain a copy of the Super Bowl recorded on her brother's receiving device 118a for viewing on her receiving device 118b. Similarly, customer 2 can send video programs, audio programs, movies and other data from her receiving device 118b to customer 1's receiving device using the system described herein. Customers 1 and 2 can exchange various video programs with each other they wish using the system described herein.

Assume other people at the same Super Bowl party are not part of the same secure content sharing group 250. Such people, will not be able to access the recorded version of the Super Bowl for customer 1, even if they have the same satellite network provider. Unless the proper authorizations have been provided, the customer 1 would not be able to exchange recorded data or video program information with them. Without the proper codes and authorization access provided by the program distributor, such sharing is not permitted.

C. Example Interactions of a Secure Content Sharing System

Figure 3A:
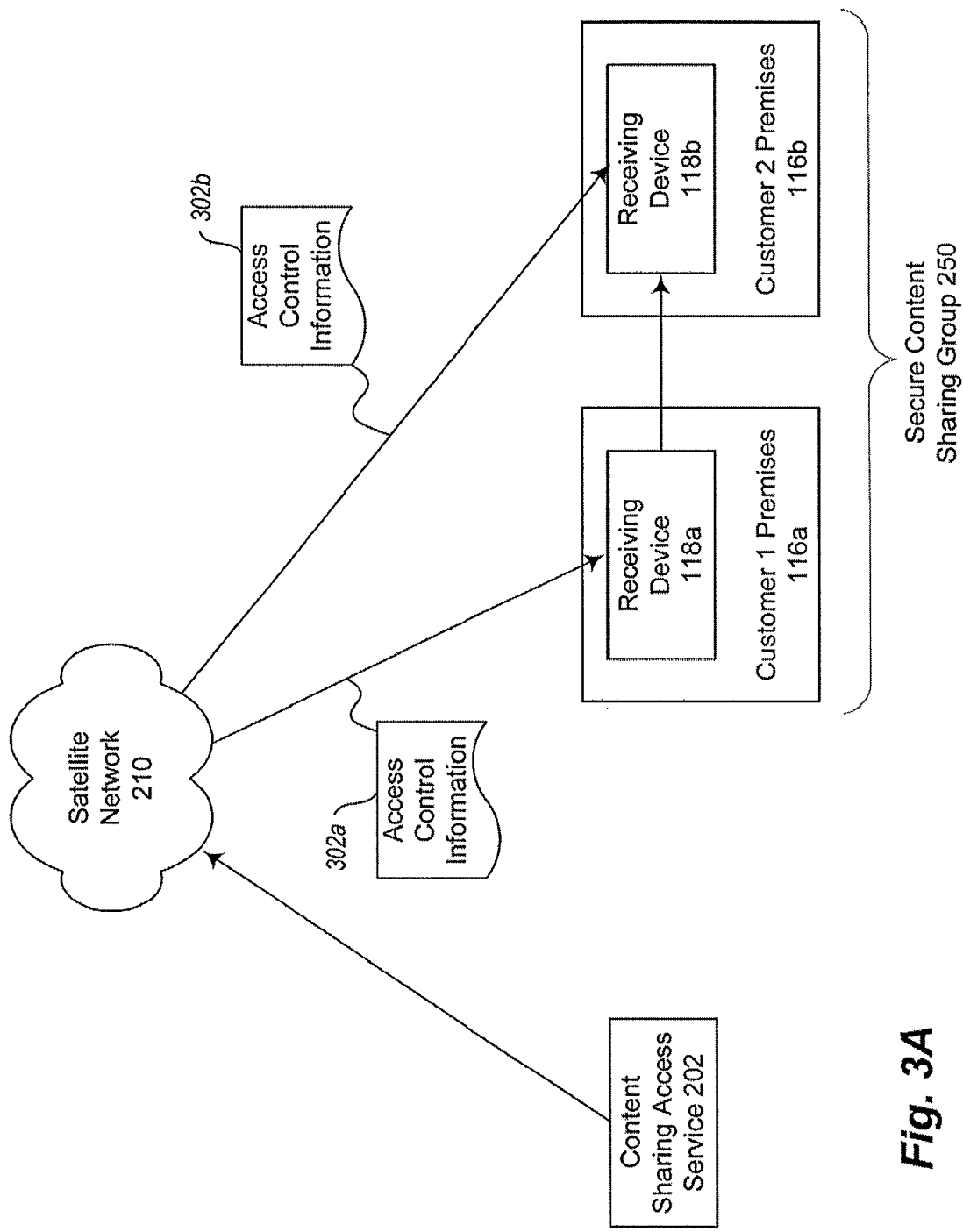
FIGS. 3A-3B illustrate examples of interactions between portions of an example embodiment of a secure content sharing system.
Figure 3B:
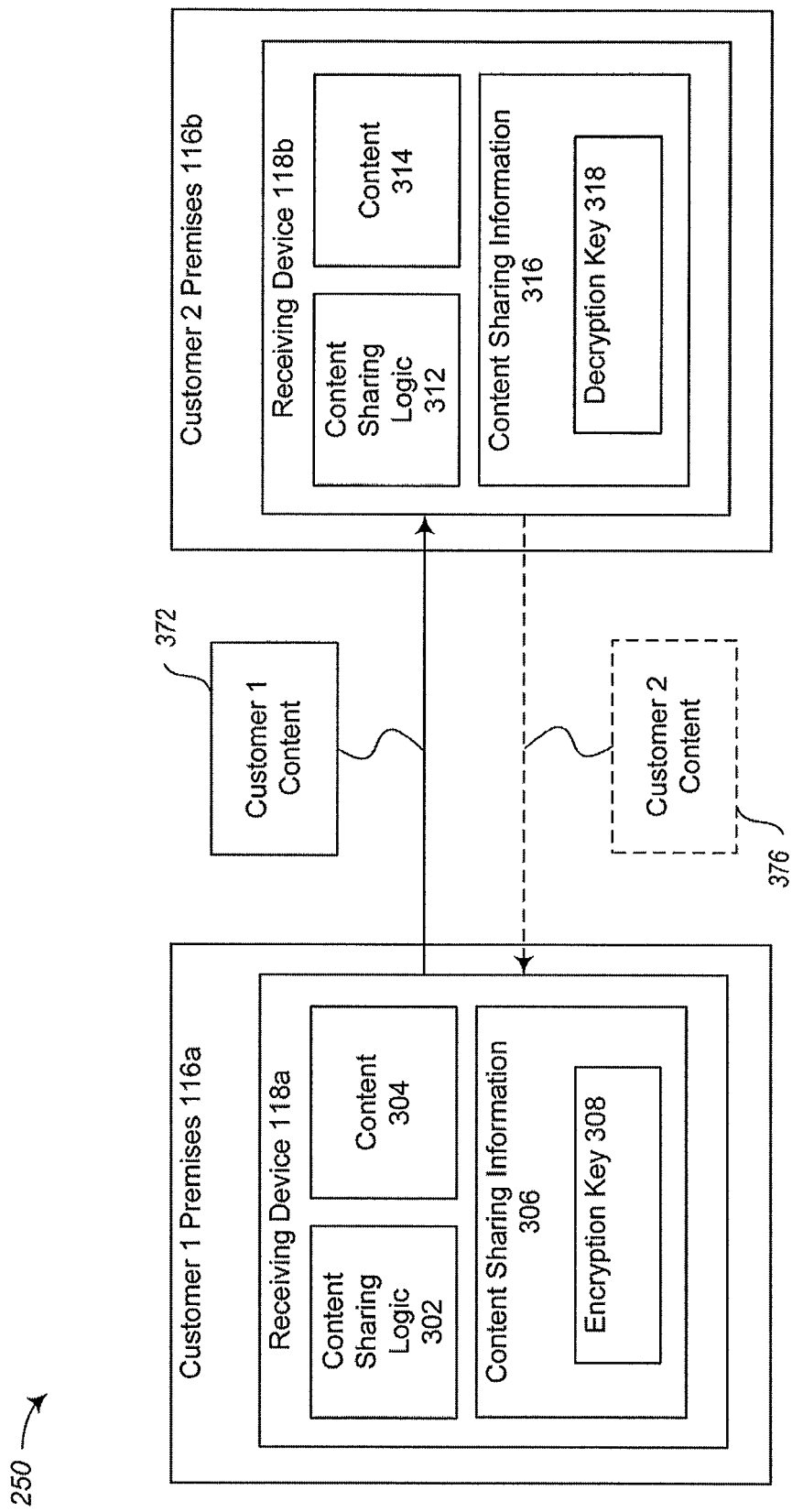

FIGS. 3A-3B illustrate examples of interactions between portions of a secure content sharing system 200.

In particular, FIG. 3A illustrates a content sharing access service 202 providing access control information via a satellite network 210 to a receiving device 118a located at a customer 1 premises 116a, and providing access control information 302b to a receiving device 118b located at a customer 2 premises 116b, such as to enable the receiving device 118a to securely share content with the receiving device 118b, such as in a secure content sharing group 250. In this example, the content sharing access service 202 has received an indication to enable a content sharing group 250, that includes the receiving device 118a as a sharing receiving device and the receiving device 118b as a receiving device that is authorized to access content shared by the receiving device 118a, such as, for example, in response to an indication by a customer 1 associated with the customer 1 premises 116a to create such a group.

The content sharing access service 202 determines appropriate access control information to provide to the various receiving devices in the secure content sharing group such that the receiving devices may exchange encrypted content that only the receiving devices in the secure content group may access, and provides the appropriate information to the various receiving devices via the satellite network 210. In this illustrated example, the content sharing access service 202 provides access control information 302a to the receiving device 118a that enables or otherwise instructs the receiving device 118a to determine an appropriate encryption key to use for sharing content with one or more other receiving devices included the secure content sharing group 250, such as the receiving device 118b. The content sharing access service 202 also provides access control information 302b to the receiving device 118b that enables or otherwise instructs the receiving device 118b to determine an appropriate decryption key to use for accessing shared content of the receiving device 118a.

In some embodiments, the encryption key and the decryption key may be symmetric keys (e.g., such as shared secret keys), and in such embodiments the receiving device 118a encrypts content for use by the receiving devices in the secure content sharing group 250 using a symmetric key algorithm, such as DES ("Data Encryption Standard"), Triple DES, AES ("Advanced Encryption Standard"), Blowfish, RC5, RC5, RC66, Vernam Ciphers, or the like. In other embodiments, the encryption key and the decryption key may be an asymmetric key pair, and in such embodiments the receiving device 118a encrypts content for use by the receiving devices in the secure content sharing group 250 using an asymmetric algorithm such as RSA ("Rivest, Shamir, Adelman"), ElGamal, or the like.

In some embodiments, the access control information may include an identifier or information that is uniquely associated with the secure content sharing group (e.g., such as a randomly generated identifier; a customer identifier; an identifier associated with the sharing receiving device; etc.), such that the receiving devices may individually generate and/or otherwise obtain an appropriate cryptographic key to use with the secure content sharing group. For example, in some embodiments access control information 302a and 302b may include a unique identifier that is associated with the content sharing group 250, with each of the receiving devices 118a and 118b using that information to seed a key generation algorithm to generate an appropriate cryptographic key (e.g., receiving device 118a generates an encryption key, and receiving device 118b generates a decryption key). In some such embodiments, the access control information may also include indications of one or more key generation algorithms/techniques to use for generating cryptographic keys.

In other embodiments, the access control information may otherwise indicate one or more keys for the receiving devices to use in the secure content sharing group. For example, the access control information 302a and 302b may indicate keys that are currently stored (e.g., in a cryptographic key storage hardware, in memory, on disk, etc.) or otherwise available to the receiving devices. In some embodiments, the access control information may include the appropriate cryptographic keys, such as access control information 302a may include the encryption key, and access control information 302b may include the decryption key.

In some embodiments, the access control information may include various other information. For example, in some embodiments, the access control information 302a and 302b may include indications of an encryption algorithm to use for encrypting/decrypting shared content, indications of where to obtain shared content (e.g., network address of the sharing device 118a), access identifiers to use in obtaining/providing shared content, etc. In some situations and embodiments, the access control information 302a and 302b may contain the same information and/or may contain different information.

As previously noted, the content sharing access service 202 determines appropriate access control information to provide to the receiving devices in a secure content sharing group. In some embodiments, such information may be stored in a database and/or other storage medium in association with the access control group, such that the content sharing access service 202 may obtain appropriate access control information from such storage when configuring various receiving devices to participate in the secure content sharing group. When the content sharing access service 202 receives indications to add other devices (not shown) to the content sharing group 250, the content sharing access service 202 determines the appropriate access control information associated with the secure content sharing group (e.g., obtains from storage) and provides such information to the addition receiving devices via the satellite network 210.

In some embodiments, the access control information 302a, which enables the receiving device 118a to encrypt shared content for the secure content sharing group 250, may be provided to the receiving device 118a prior to adding other receiving devices, such as the receiving device 118b, to the secure content group 250. For example, in some embodiments, the receiving device 118a may be preconfigured by the content sharing access service 202 to encrypt shared content for other devices in the secure content sharing group 250.

Various other embodiments may include various other features and/or functionality. In some embodiments, the access control information itself may be encrypted by the content sharing access service 202 prior to being provided to the various receiving devices in the secure content sharing group, such that only the receiving devices that are intended to receive the access control information may access such encrypted information. For example, the access control information 302a may be encrypted by way of an identifier or key, such as a subscription key, service key, user key, hardware identifier, or the like, that is uniquely associated with the receiving device 118a, such that only the receiving device 118a may decrypt the content. Access control information 302b may be similarly encrypted for access by the receiving device 118b. In addition, in some embodiments, the access control information and/or cryptographic keys may be periodically changed/updated for a secure content sharing group, and in such cases the content sharing access service 202 may provide new access control information to the various receiving devices in the secure content sharing group.

FIG. 3B continues the example of FIG. 3A and illustrates a secure content sharing group 250, with the receiving device 118a located at customer 1 premises 116a securely sharing content 372 with the receiving device 118b located at the customer 2 premises 118b in accordance with various of the described techniques.

The receiving device 118a includes content sharing logic 302, content 304, and content sharing information 306 including an encryption key 308. The content sharing logic 302, when executed by the receiving device 118a, enables the receiving devices 118a to securely share content 304 of the receiving device 118a with other receiving devices in a secure content sharing group, such as receiving device 118b. The content 304 includes programming content and/or other content that is stored on or otherwise accessible to the receiving device 118a, some of which may be shared by the receiving device 118a. The content sharing information 306 includes information related to one or more content sharing groups that the receiving device 118a may be included in. For example, in this illustrated embodiment, the content sharing information includes the encryption key 308 that the receiving device 118a uses to encrypt content that it shares with receiving devices in the secure content sharing group 250.

The receiving device 118b includes content sharing logic 312, content 314, and content sharing information 316 including a decryption key 318. The content sharing logic 312, when executed by the receiving device 118b, enables the receiving devices 118b to access or otherwise obtain content shared by the receiving device 118a. The content 314 includes programming content and/or other content that is stored on or otherwise accessible to the receiving device 118b, including content that the receiving device 118b has obtained from one or more other receiving devices, such as receiving device 118a. The content sharing information 316 includes information related to one or more content sharing groups that the receiving device 118b may be included in. For example, in this illustrated embodiment, the content sharing information includes the decryption key 318 that the receiving device 118b uses to decrypt content that the receiving device 118a shares with receiving devices in the secure content sharing group 250.

In this particular example, the receiving devices 118a and 118b have respectively received access control information 302a and 302b from the content sharing access service 202, such as illustrated in FIG. 3A. In response to receiving access control information 302a, the receiving devices 118a has determined the encryption key 308 to use for encrypting content (such as content 304) that the receiving device 118a shares with other receiving devices in the secure content sharing group 250, such as receiving device 318b. For example, the content sharing logic 302 may include logic for generating and/or otherwise obtaining the encryption key 308 based on the received access control information, and may store the encryption key 308 for later use in encrypting shared content. Similarly, in response to receiving access control information 302b, the receiving device 118b has determined the decryption key 318 to use for decrypting content that the receiving device 118a shares in the secure content sharing group 250, and has stored the decryption key 318 for later use in decrypting such content.

The receiving device 118a receives requests and/or other indications to share one or more pieces of content 304 with a receiving device 118b in the secure content sharing group 250. In response to such requests, the receiving device 118a determines an appropriate encryption key to use for encrypting the requested content, such as the encryption key 308 associated with the secure content sharing group 250. After the appropriate encryption key 308 has been determined, the receiving device encrypts the requested content using the encryption key 308 and provides the encrypted requested content 372 for use by the receiving device 318b.

When encrypting requested shared content, the receiving device 118a may encrypt some or all of the requested content using the encryption key 308. For example, in some embodiments, the receiving device may only encrypt audio and/or video tracks of content that includes both audio and video tracks; may encrypt one or more segments of a video/audio track (e.g., every other second), etc. In some embodiments, the requested content may already be encrypted, such as by the program distributor or other content provider who provided the content to the receiving device 118a. In some such cases, when the receiving device 118a shares such requested content, the receiving device may not encrypt the content itself, as it is already encrypted, but may instead encrypt one or more cryptographic keys that may be used to decrypt the requested content using the encryption key 308, and provides those encrypted keys along with the requested content.

The encrypted content 372 may be provided to the receiving device 118b in various ways in various embodiments. For example, in some embodiments, the receiving device 118a may send the encrypted content 372 directly to the receiving device 118a via a communication network, such as by sending, writing, streaming, transmitting, etc. In other embodiments, the receiving device 118a may post the encrypted shared content 372 to a network server (e.g., a file server, etc.) for download by the receiving device 118a. In still other embodiments, the receiving device 118a may write the encrypted content onto a removable storage media that may subsequently be transported to the receiving device 118b.

In some embodiments, the content sharing logic 302 and/or 312 enables the receiving devices 118a and 118b, respectively, to interactively share content, such as over a communication network (e.g., the other communication network 212 of FIG. 2). For example, in some such embodiments, the receiving device 118b may interact via a communication network with the receiving device 118a to request shared content, with the receiving device 118a encrypting and providing the requested shared content to the receiving device 118b in response to such a request.

After the receiving device 118b receives or otherwise obtains the encrypted content 372, the receiving device 118b may determine an appropriate decryption key to use with such content 372 shared by the receiving device 118a, such as the decryption key 318 associated with the secure content sharing group 250, and decrypts the content 372. After the content has been decrypted, the receiving device may present and/or otherwise use the content as appropriate.

Although this embodiment has been described in terms of one-way sharing, from receiving device 118a to receiving device 118b, other embodiments are possible. In some embodiments, the access control information provided by the content sharing access service 202 may enable the receiving devices in the content sharing group 250 to share content in a two-way manner, such that each of the devices in the group may encrypt and share content that other receiving devices in the group may decrypt. For example, as illustrated in FIG. 3B, the receiving device 118a may optionally obtain shared content 376 from the receiving device 118b. In some such embodiments, the receiving device 118a may be able to perform both encryption and decryption using the encryption key 308, while the receiving device 118b may be able to perform both encryption and decryption using the decryption key 318, although in other embodiments other keys (not shown) may have been determined from the access control information provided to the respective receiving devices 118a and 118b that may be used for such purposes of two-way sharing. In still other embodiments, an additional secure content sharing group may formed (not shown), in addition to the content sharing group 250, that includes the receiving device 118b as the sharing device and the receiving device 118a as a device that obtains shared content from the receiving device 118b, with access control information being provided by the content sharing access service 202 as appropriate to enable such secure sharing between the additional group.

In some embodiments, the sharing logic 302 and/or 312 may enable a customer to configure or/other manage secure content sharing groups. For example, the sharing logic 302 may enable a customer to interact with an embodiment of the content sharing access service 202 to specify/manage one or more content sharing groups. In other embodiments, the content sharing logic 302 and/or 312 may enable customers to control access to various content of a receiving device. For example, the content sharing logic 302 may provide functionality that allows a customer/user interacting with the receiving device 118a to specify or otherwise indicate particular content that the customer/user wishes to share, such as by specifying particular pieces of content (e.g., a particular program, album, song, photo album, picture, etc.), particular categories of content (e.g., by type, such as programming, music, photo albums, etc; by ratings, such as PG, TV-PG, etc; and the like), etc. In a similar fashion, the content sharing logic 302 may also enable a customer/user of the receiving device 118a to mark or otherwise indicate content that is not to be shared. In addition, the content sharing logic 302 may enable the customer/user to provide and/or restrict various shared content for use by particular other receiving devices in a secure content sharing group, such as by enabling the customer/user to specify which of the shared content (e.g., particular content, types of content, etc.) each of the one or more of the other receiving devices in the secure content sharing group are allowed to access. For example, the customer may use such functionality to permit customer 2's receiving device 118b to access all shared content, while restricting access to such shared content for another receiving device in the secure content sharing group to children's programming and/or particular photo albums, etc.

In addition, the cryptographic keys (encryption key 308 and decryption key 318) determined respectively by the receiving devices 118a and 118b based on the provide access control information (302a and 302b) may be used in other ways in other embodiments of a secure content sharing group. For example, in some embodiments, the receiving devices 118a and 118b may use their respective cryptographic key for the purposes of authenticating each other and/or other receiving devices in the secure content sharing group 250. For example, the receiving devices 118a and 118b may authenticate the identity of the other device using their cryptographic keys to generate/validate digital signatures. In some such embodiments, after a receiving device 118a has authenticated the identity of the other receiving device 118b as being part of the secure content sharing group (or vice versa), the receiving device may provide other services and/or functionality for use by the receiving device 118b.

D. Example Computing System Implementation

Figure 4:
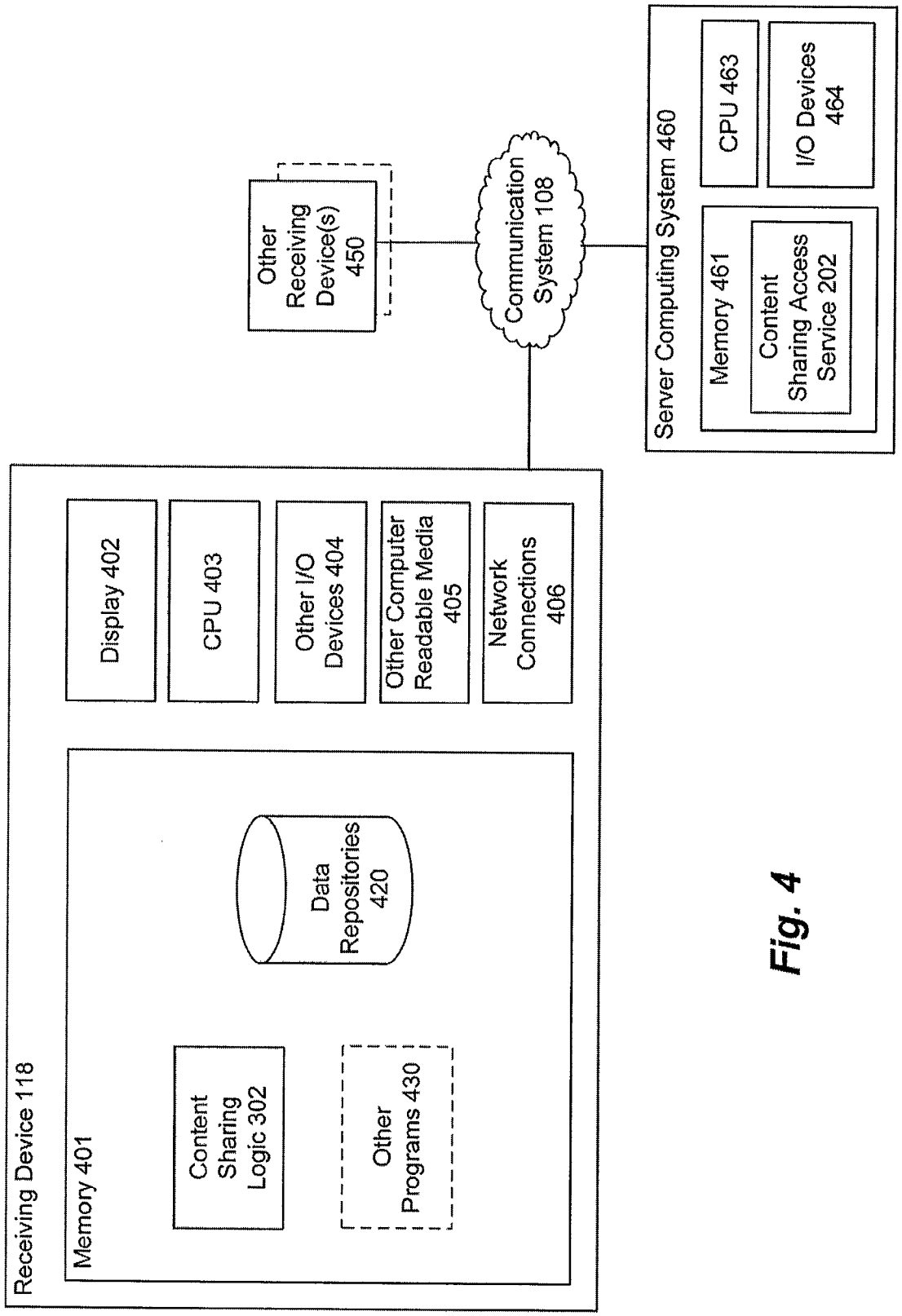
FIG. 4 is a block diagram of example computing systems suitable for executing example embodiments of a secure content sharing.

FIG. 4 is a block diagram of example computing systems suitable for executing example embodiments of portions of a secure content sharing system. FIG. 4 shows a receiving device computing system 118 that may be utilized to implement an embodiment of content sharing logic 302, and a server computing system 460 that may be utilized to implement and embodiment of the content sharing access service 202. The server computing system 460 may be provided by a program distributor (e.g., the program distributor 106 of FIGS. 1 and 2).

In one embodiment, the receiving device computing system 118 is configured to receive and display programming on a presentation device. In addition, the receiving device 118 may comprise one or more distinct computing systems/devices and may span distributed locations. Furthermore, each block shown may represent one or more such blocks as appropriate to a specific embodiment or may be combined with other blocks. Also, the content sharing logic 302 may be implemented in software, hardware, firmware, or in some combination to achieve the capabilities described herein.

In the embodiment shown, the receiving device computing system 118 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. Content sharing logic 302 is shown residing in memory 401. In other embodiments, some portion of the contents of the content sharing logic 302 may be stored on and/or transmitted over the other computer-readable media 405. The content sharing logic 302 preferably executes on one or more CPUs 403 to securely share and/or access shared content, and/or to configure the receiving device 118 to perform operations related secure content sharing, as described herein. Other code or programs 430 (e.g., a user interface ("UI") manager, an audio/video processing module, a program guide manager module, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405, etc. The other receiving devices 450 may include similar components and/or blocks to those described with respect to the receiving device 116, although such are not shown in FIG. 4 here.

The content sharing logic 302 performs various of the described functionality of the receiving device 118 related to secure content sharing such as describe with respect to FIGS. 2 and 3A-3B above. For example, the content sharing logic 302 may receive and/or otherwise obtain access control information, such as provided via the communication system 108, and determine based on such information a cryptographic content key to use for secure content sharing and/or access shared content generate, as well as perform encryption/decryption as appropriate for sharing content in a secure content sharing group. In addition the content sharing logic 302 may interact via the communication system 108 with one or more other receiving devices 450, and possibly with the server computing system 460, and/or with other computing systems or devices (not shown), to perform various of the described operations related to secure content sharing.

The data repositories 420 may include content, such as programming content and/or other types of content obtained from a program distributor (not shown) and/or one or more other computing systems (e.g., content providers 104a-104i, information providers 138a-138i from FIG. 1), such as via communication system 108. The content may be received from various other sources, including the other computer-readable media 405 and/or other computing systems or devices (not shown), such as computing systems/devices located at a customer premises with the receiving device 118, etc. As discussed elsewhere, such content may include programming, clips, audio/video, audio, images, and/or other data files, etc. In at least one embodiment, at least some of the content included in the data repositories 420 may be encrypted for restricted access by the receiving device computing system 118 (e.g., by a program distributor or other content provider) and may include one or more corresponding encryption keys that are usable for decrypting at least portions such content.

In this illustrated embodiment, the server computing system 460 comprises a memory 461, one or more CPUs 463, Input/Output devices 464 (e.g., keyboard, mouse, CRT or LCD display, and the like), and/or various other components (not shown), e.g., computer readable media, network connections, etc. The content sharing access service 202 preferably executes on one or more CPUs 463 to configure and/or specify one or more secure content sharing groups, as described herein. Furthermore, each block shown may represent one or more such blocks as appropriate to a specific embodiment or may be combined with other blocks. Also, the content sharing access service 202 may be implemented in software, hardware, firmware, or in some combination to achieve the capabilities described herein.

The content sharing access service 202 performs various of the described functionality, as described in FIGS. 2 and 3A-3B. In particular, the content sharing access service 202 may interact with the receiving device 116 and other receiving devices 450 via the communication system 108, such as to configure and/or otherwise manage receiving devices to participate in secure content sharing groups.

In an example embodiment, components/modules of the content sharing logic 302 and/or the Content Sharing Access Service 202 are implemented using standard programming techniques. For example, the content sharing logic 302 and/or the Content Sharing Access Service 202 may be implemented as "native" executables running on the CPU 403 and CPU 463 respectively, along with one or more static or dynamic libraries. In other embodiments, the content sharing logic 302 and/or the Content Sharing Access Service 202 may be implemented as instructions processed by virtual machine. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by an HDM implementation. Also, other functions could be implemented and/or performed by each component/module, and in different orders, and by different components/modules, yet still achieve the functions of the HDM.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HDM.

Furthermore, in some embodiments, some or all of the components of the content sharing logic 302 and/or the Content Sharing Access Service 202 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

E. Processes

Figure 5:
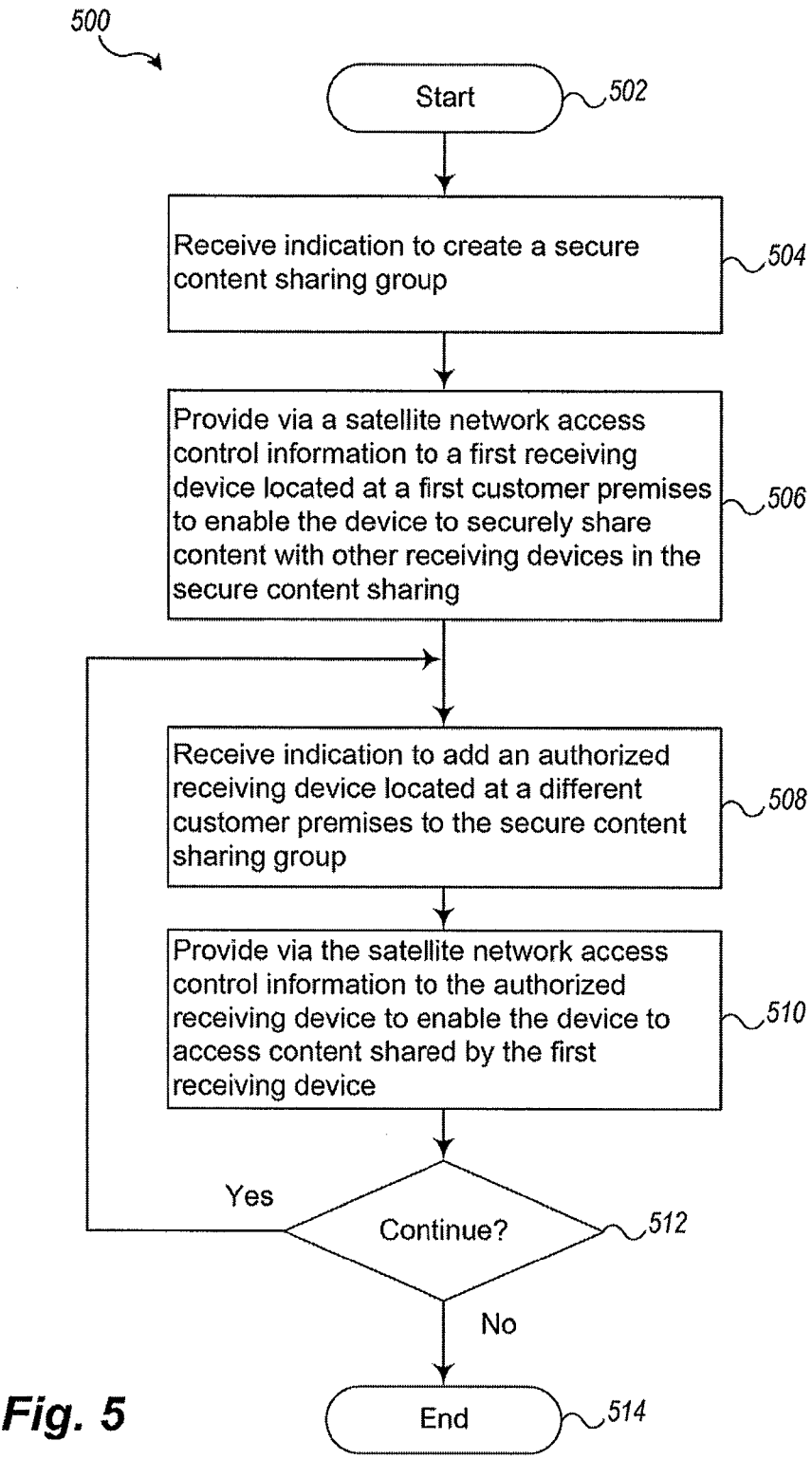
FIG. 5 is a flow diagram of an example content sharing access service process.

FIG. 5 is a flow diagram of an example content sharing access service process according to one embodiment. In particular, FIG. 5 illustrates a process 500 that may be performed, for example, as part of the content sharing access service 202 executing on the program distributor 106, such as illustrated with respect to FIGS. 2 and 3A, and/or executing in memory 461 on an embodiment of the server computing system 460 of FIG. 4.

The illustrated process 500 starts at 502. At 504, the process receives and indication to create a secure content sharing group. Typically, this indication is received from a first receiving device located at a first customer premises, so as to configure such a first receiving device to securely share content with other receiving devices located at other customer premises. For example, a customer associated with the first customer premises may be interacting with a user interface provided by the first receiving device to indicate a desire to create a secure content sharing group. Although, in other embodiments, such indications may be received from other sources. In some embodiments, the process may further determine the identity and/or location of the first receiving device, such as based on information stored in a customer database, etc.

At 506, the process provides access control information to the first receiving device located at the first customer premises to enable the receiving device to securely share content with other receiving devices that are currently in and/or will be added to the secure content sharing group. The access control information is provided to the first receiving device via a satellite communication network. As discussed elsewhere, such access control information may include various identifiers and/or information associated with the content sharing group that may be used by the first receiving device to determine a cryptographic key with which to encrypt shared content for use by other devices in the secure content sharing group.

At 508, the process receives an indication to add an authorized receiving device located at a different customer premises to the secure content sharing group. Typically, this indication is received from the first receiving device, such as in response to a customer associated with the first receiving device indicating another customer and/or another customer's receiving device with which the first customer desires to share content. In some embodiments, the process may further determine the identity and/or location of the authorized receiving device, such as by searching a database or other information storage that includes information associating one or more customers to receiving devices of those customers.

At 510, the process provides access control information to the authorized receiving device to enable that device to access content shared by the first receiving device. As discussed elsewhere, such access control information may include various identifiers and/or information associated with the content sharing group that may be used by the authorized receiving device to determine a cryptographic key with which to decrypt content shared by the first receiving device.

At 512, the process determines whether to continue. If so, the process returns to step 508 to receive other indications to add additional authorized receiving devices to the secure content sharing group. If not, the process ends at 514.

Figure 6A:
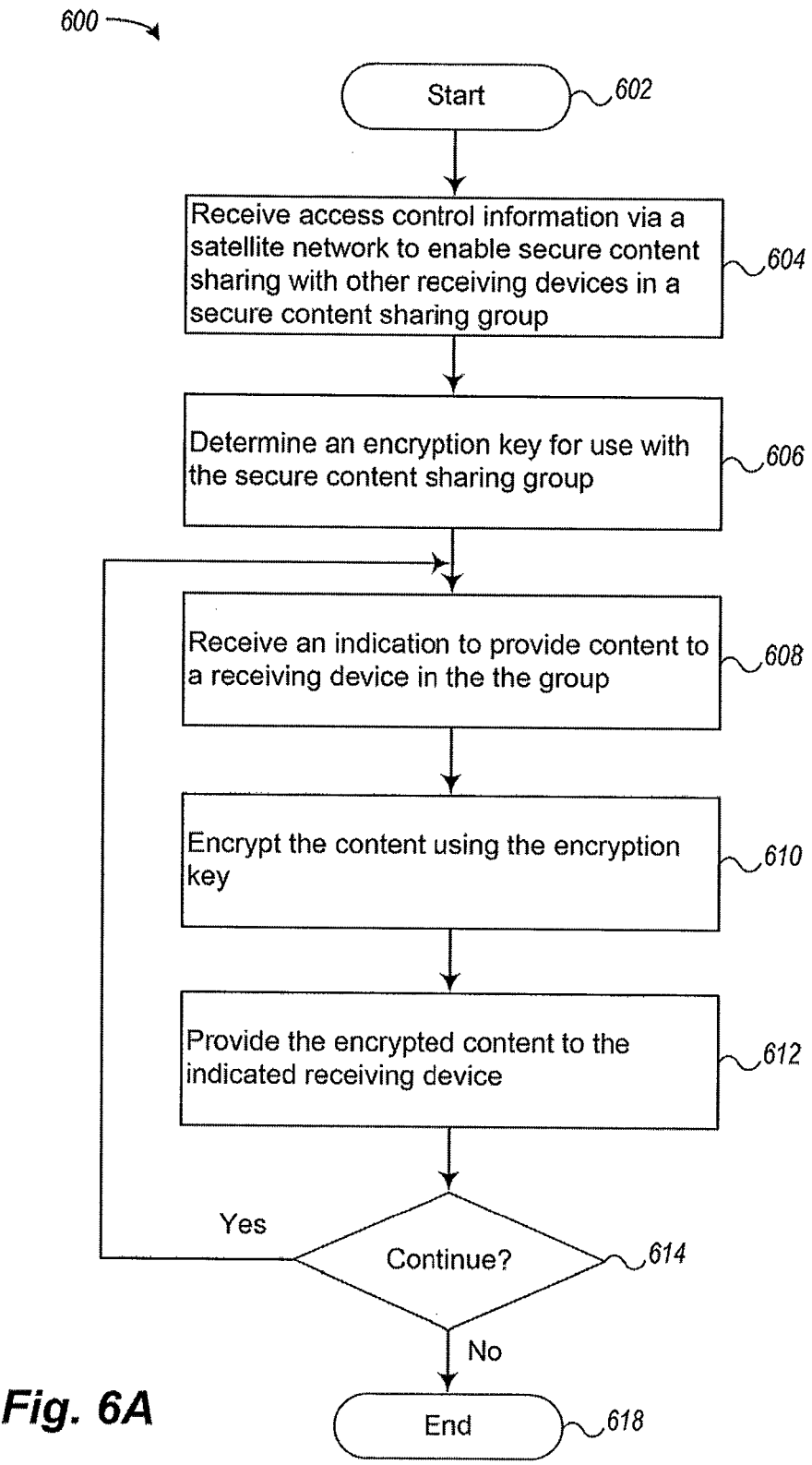
FIGS. 6A-6B are flow diagrams of example content sharing client processes.
Figure 6B:
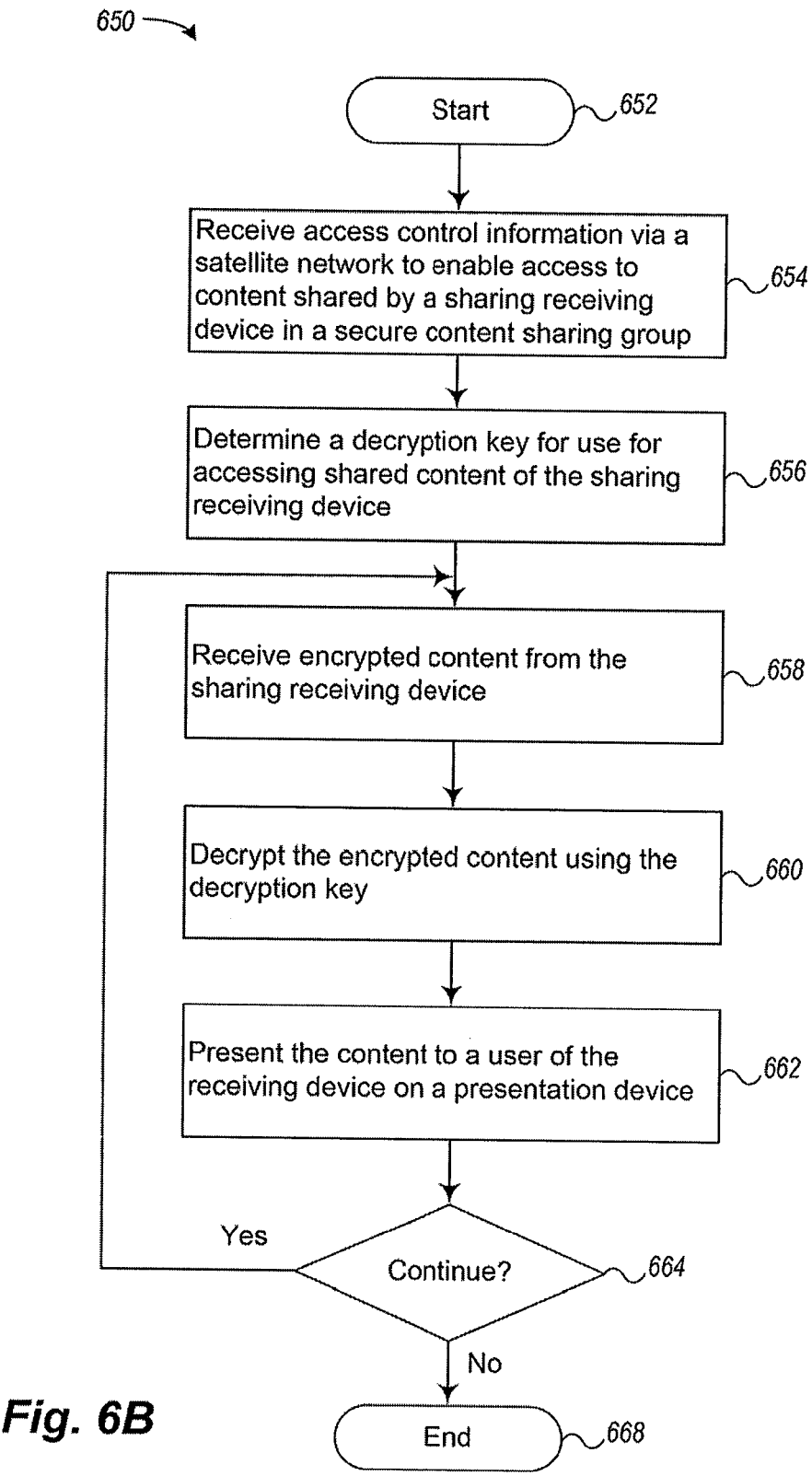

FIGS. 6A-6B are flow diagrams of example content sharing client processes. In particular, FIGS. 6A and 6B illustrate processes 600 and 650, respectively, that may be performed, for example, by the content sharing logic 302 and 312 executing on the receiving devices 118a and 118b of FIG. 3B, and/or execution of the content sharing logic 302 executing in memory 401 of the receiving device 118 of FIG. 4. Although processes 600 and 650 are illustrated in FIGS. 6A and 6B as separate processes, in other embodiments, such processes may be provided as part of a single process executing on a receiving device with steps of the various illustrated processes 600 and 650 being performed as appropriate based on various received indications, information and/or requests.

In FIG. 6A, the illustrated process 600 starts at 602. At 604, the process receives access control information via a satellite network to enable the receiving device to securely share content with other receiving devices in a secure content sharing group. Such access control information may be provided by execution of step 506 of process 500 (FIG. 5).

At 606, the process determines based on the received access control information an encryption key to use for encrypting content that the receiving device shares with other receiving devices in the secure content sharing group. For example, in some embodiments, the receiving device may generate and/or otherwise obtain the encryption key based on the information included in the provided access control information.

At 608, the process receives and indication to provide content to another receiving device that is in the secure content sharing group. Typically, this indication will be received from the other receiving device, such as via a communication network (e.g., the Internet), although the indication may be received from other sources in other embodiments.

At 610, in response to the received indication in step 608, the process encrypts the requested content using the determined encryption key.

At 612, the process provides the encrypted content to the other receiving device in the content sharing group. Typically, the encrypted content may be provided to the other receiving device via a communication network (e.g., the Internet).

At 614, the process determines whether to continue. If so, the process returns to step 608 to receive additional requests to share content. Otherwise, the process ends at 618.

In FIG. 6B, the illustrated process 650 starts at 652. At 654, the process receives access control information via a satellite network to enable the receiving device to access content shared by a sharing receiving device in a secure content sharing group. Such access control information may be provided by execution of step 510 of process 500 (FIG. 5).

At 656, the process determines based on the received access control information a decryption key to use for decrypting shared content that the receiving device receives from the sharing receiving device in the secure content sharing group. For example, in some embodiments, the receiving device may generate and/or otherwise obtain the decryption key based on the information included in the provided access control information. In some embodiments, the process may store the determined decryption key.

At 658, the process receives encrypted shared content from the sharing receiving device in the secure content sharing group. For example, such content may be received based on execution of step 612 of the process 600 (FIG. 6A).

At 660, the process decrypts the received shared content using the determined decryption key.

At 662, the process presents the decrypted shared content to a user of the receiving device on a presentation device, such as a television, computer and/or other presentation device. In other embodiments, the received shared content may be used by the receiving device in other manners as appropriate, such as for example, playing the content on an audio device, storing/transmitting to another device (e.g., a PC) for use by that other device, etc.

At 664, the process determines whether to continue. If so, the process returns to step 658 to receive other shared content. Otherwise, the process ends at 668.

In other embodiments, the process 650 may perform additional and/or other steps not illustrated. For example, in some embodiments, the process may interact with a sharing receiving device to request and/or otherwise obtain the encrypted shared content from the sharing receiving device.

While various embodiments have been described hereinabove, it is to be appreciated that various changes in form and detail may be made without departing from the spirit and scope of the invention(s) presently or hereafter claimed.

The invention claimed is:

1. A system to facilitate secure content sharing between a plurality of set-top boxes, comprising:
a satellite communication system;
a plurality of set-top boxes communicatively coupled to the satellite communication system, each set-top box of the plurality of set-top boxes being located at a distinct respective customer premises; and
a distribution server communicatively coupled to the satellite communication system, the distribution server configured to provide access control information via the satellite communication system to a first set-top box of the plurality of set-top boxes and to at least a second set-top box, the access control information enabling the first set-top box to share content of the first set-top box with the second set-top box,
wherein the first set-top box is configured to receive via the satellite communication system from the distribution server the access control information, to determine a first cryptographic key based on the access control information, to share content of the first set-top box for use by the second set-top box, and to restrict access to the shared content by encrypting at least a portion of the shared content using the first cryptographic key, such that the second set-top box has access to the shared content and other set-top boxes of the plurality of set-top boxes do not have access to the shared content; and
wherein the second set-top box is configured to receive via the satellite communication system from the distribution server the access control information, to determine a second cryptographic key based on the access control information received by the second set-top box, and to access the shared content of the first set-top box by decrypting the at least a portion of the shared content using the second cryptographic key.

2. The system of claim 1, wherein the first set-top box is further configured to generate the first cryptographic key based at least in part on the receiving the access control information.

3. The system of claim 1, wherein the first cryptographic key is received as at least part of the access control information received by the first set-top box.

4. The system of claim 1, wherein the first and second cryptographic keys are at least one of symmetric keys and an asymmetric key pair.

5. The system of claim 1, wherein the first set-top box is further configured to receive a request to share a particular piece of content of the first set-top box for use by the second set-top box, and to provide the requested content piece to the second set-top box in response to the request.

6. The system of claim 1, wherein the distribution server is further configured to provide the access control information to the second set-top box in response to receiving an indication of a desire of a user of the first set-top box to share content of the first set-top box with the second set-top box.

7. A method for securely sharing data, the method comprising:
under control of a first set-top box located at a first customer premises,
receiving first access control information via a content distribution system;
determining a first cryptographic key based at least in part on the first access control information;
sharing data of the first set-top box for use by a second set-top box, the second set-top box being located at a distinct second customer premises; and
restricting access to the shared data by encrypting at least a portion shared data using the first cryptographic key, the second set-top box receiving second access control information via the content distribution system and determining a second cryptographic key based at least in part on the second access control information, the second cryptographic key enabling decryption of the at least a portion of the shared data.

8. The method of claim 7 wherein the determining the first cryptographic key includes generating the first cryptographic key in response to receiving the first access control information.

9. The method of claim 7, wherein the at least a portion of the shared data is a decryption key that may be used to decrypt at least some other portion of the shared data.

10. The method of claim 7, wherein the sharing data of the first set-top box for use by the second set-top box includes receiving a request from the second set-top box for the data of the first set-top box, and providing the data to the second set-top box in response to the request.

11. The method of claim 7, wherein the shared data includes programming content provided to the first set-top box via the content distribution system.

12. The method of claim 7, further including, under control of the first set-top box, receiving from a user of the first set-top box an indication of a desire to share data of the first set-top box for use by the second set-top box, wherein the second access control information is provided to the second set-top box in response to the indication of the desire.

13. The method of claim 7, further comprising:
under control of the second set-top box,
determining a second cryptographic key based on the second access control information;
receiving the shared data from the first set-top box restricted for access by the second set-top box; and
decrypting at least a portion of the shared data with the second cryptographic key.

14. The method of claim 7, wherein the content distribution system is a satellite communication system.

15. A method to facilitate secure content sharing between a plurality of set-top boxes, the method comprising:
under control of a distribution server,
receiving a request to enable access for a second set-top box to content of a first set-top box, the first set-top box located in a first customer premises and the second set-top box located in a second customer premises distinct from the first customer premises;
providing to the first and second set-top boxes, via a program distribution system, access control information that enables the first and second set-top boxes to securely share content, the providing including:
providing to the first set-top box information indicative of a first encryption key for use by the first set-top box to encrypt content of the first set-top box provided for access by the second set-top box; and
providing to the second set-top box information indicative of a second encryption key for use by the second set-top box to decrypt content provided by the first set-top box for access by the second set-top box.

16. The method of claim 15, wherein the information indicative of the second encryption includes a command for the second set-top box to generate the second encryption key.

17. The method of claim 15, wherein the access control information is provided to the second set-top box in response to receiving the request to enable access for the second set-top box.

18. The method of claim 15, wherein the request to enable access for the second set-top box is received from the first set-top box.

19. The method of claim 15, wherein the program distribution system is a satellite communication system.

* * * * *

UNITED STATES PATENT AND TRADEMARK OFFICE
CERTIFICATE OF CORRECTION

| | | |
|---|---|---|
| PATENT NO. | : 8,458,742 B2 | Page 1 of 1 |
| APPLICATION NO. | : 12/495327 | |
| DATED | : June 4, 2013 | |
| INVENTOR(S) | : Parker et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 662 days.

Signed and Sealed this
Thirtieth Day of December, 2014

Michelle K. Lee
*Deputy Director of the United States Patent and Trademark Office*